(12) United States Patent
Rosauro Clarke et al.

(10) Patent No.: US 12,036,586 B2
(45) Date of Patent: Jul. 16, 2024

(54) DEVICE FOR REMOVING INTERNAL BLOCKAGE MATERIALS FROM A FLUID-CONVEYING LINE

(71) Applicants: PETROLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Thomas Gabriel Rosauro Clarke, Porto Alegre (BR); Ricardo Reppold Marinho, Rio de Janeiro (BR); Rafael Eugenio Dos Santos, Porto Alegre (BR); Mariane Chludzinski, Porto Alegre (BR); Marcelo Torres Piza Paes, Rio de Janeiro (BR); Gustavo Cordenonsi Da Fonseca, Porto Alegre (BR); Giovani Dalpiaz, Porto Alegre (BR)

(73) Assignees: PETROLEO BRASILEIRO S.A.—PETROBRAS, Rio de Janeiro (BR); UNIVERSIDADE FEDERAL DO RIO GRANDE DO SUL—UFRGS, Centro Porto Alegre (BR)

( * ) Notice: Subject to any disclaimer, the term of this patent is extended or adjusted under 35 U.S.C. 154(b) by 800 days.

(21) Appl. No.: 17/054,620

(22) PCT Filed: May 15, 2019

(86) PCT No.: PCT/BR2019/050179
§ 371 (c)(1),
(2) Date: Nov. 11, 2020

(87) PCT Pub. No.: WO2019/218041
PCT Pub. Date: Nov. 21, 2019

(65) Prior Publication Data
US 2021/0362203 A1 Nov. 25, 2021

(30) Foreign Application Priority Data

May 15, 2018 (BR) .......................... 1020180097946

(51) Int. Cl.
*B08B 9/051* (2006.01)
*B08B 9/043* (2006.01)
(Continued)

(52) U.S. Cl.
CPC ............ *B08B 9/051* (2013.01); *B08B 9/0436* (2013.01); *B08B 9/047* (2013.01); *B23D 79/023* (2013.01); *B08B 2209/04* (2013.01)

(58) Field of Classification Search
CPC ....... B08B 9/045; B08B 9/0436; B08B 9/049; B08B 9/0497; B08B 9/051; B08B 9/0535;
(Continued)

(56) References Cited

U.S. PATENT DOCUMENTS 2,038,004 A   4/1936   Russell
4,251,175 A   2/1981   Hara
(Continued)

FOREIGN PATENT DOCUMENTS

DE   3427167 A1   2/1986
GB   1 284 059 A   8/1972
(Continued)

*Primary Examiner* — Randall E Chin
(74) *Attorney, Agent, or Firm* — RAPHAEL BELLUM PLLC

(57) ABSTRACT

The present invention provides a device for removing internal blockage materials (10) from a fluid-conveying line (3), said device comprising a cutting tool (9) activated by a rotary actuator (8), in which: the cutting tool (9) is positioned at the front of the device; and the cutting tool (9) comprises a diameter that is smaller than the internal diameter of the fluid-conveying line (3).

10 Claims, 1 Drawing Sheet

(51) Int. Cl.
 *B08B 9/047* (2006.01)
 *B23D 79/02* (2006.01)
(58) Field of Classification Search
 CPC ..... B08B 9/055; B08B 2209/04; B08B 9/047; B23D 79/023
 See application file for complete search history.

(56) References Cited

U.S. PATENT DOCUMENTS

| | | |
|---|---|---|
| 4,682,921 A | 7/1987 | Blaho |
| 4,822,221 A | 4/1989 | Illakowicz |
| 5,713,093 A | 2/1998 | Enz |

FOREIGN PATENT DOCUMENTS

| | | | |
|---|---|---|---|
| KR | 20100038729 A | * | 4/2010 |
| KR | 10-1517199 | * | 5/2015 |
| WO | 95/24980 A1 | | 9/1995 |

* cited by examiner

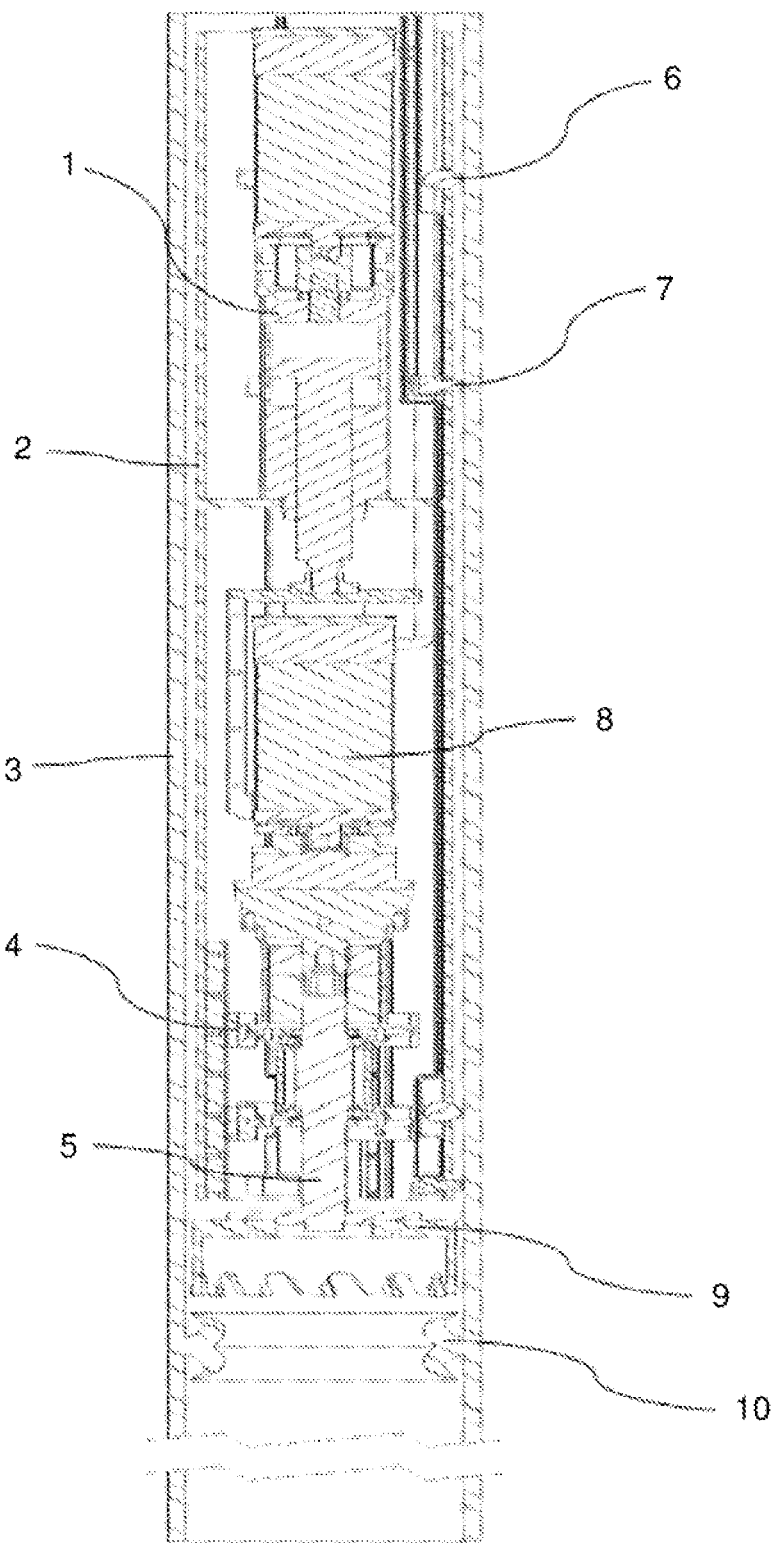

DEVICE FOR REMOVING INTERNAL BLOCKAGE MATERIALS FROM A FLUID-CONVEYING LINE

FIELD OF INVENTION

The present invention is in relation to internal maintenance technologies for pipes. More specifically, the present invention is in relation to an internal material extraction device resulting from the process of welding fluid-conveying lines.

BACKGROUND OF THE INVENTION

However, the piping, wells, funnels, ducts, conduits, pipelines for oil, gas, ore and fluids, called fluid-conveying lines, are designed to handle specific operating criteria. Therefore, these designs are sized in accordance with the properties of the fluid and the medium, operating and external pressure, temperature, discharge, transport distance, and other characteristics that affect the useful life and performance of these facilities.

In addition to the operating design characteristics of the fluid-conveying lines, there are systematic inspections and maintenance stoppages, making it possible to predict and repair areas that deviate from performance standards, prolonging operating life. Many of these deviations in performance standards are characterized by presenting loss of thickness, cracks, leaks, and undesirable microstructures, which cause reduced mechanical resistance and consequently operational failures.

Other deviations are related to internal blockages that restrict part of the flow of the material, creating turbulence and cavitation, among other issues, or completely restricting the flow of liquid being conveyed. The formation of accumulated internal material deposited on the internal walls of the transport lines may occur during manufacturing, construction, maintenance and operation.

During operation, the accumulation of internal material in most cases occurs due to electrochemical processes, such as corrosion and calcification. The accumulation of internal material arising from manufacturing, construction and maintenance forms at joints, where the mechanical and geometric characteristics vary for each type of process.

For example, the processes of solid coupling may be mentioned, which have the characteristic of joining the tops of surfaces in contact using heating by a normal force, followed, in some cases, by forging. However, as this is a process that involves shaping the contact surfaces, some of the heated material is expulsed outside the joint, creating surplus material with high mechanical resistance.

The methods most commonly used are resistance and friction, with each method being differentiated mainly by the heating source. In the resistance method, the surfaces are heated by the flow of current density that is transferred between the areas that are in contact.

In pipe friction-welding processes, the joints are bound by the energy resulting from the friction of the surfaces and shearing of the material when force is applied. For fluid-conveying lines, some equipment handles these joints by applying a ring, pipe or construction element in relative movement, used on the extremities of the fluid-conveying lines.

After the pipe-welding process, internal burrs are created which, if not removed, end up impeding internal flow.

Several documents known in the state of the art focus on resolving the mentioned problem, some of which will be presented below.

Document WO1995024980A1 reveals an apparatus to remove internal projections from inside a pipe, such as welding burrs. The apparatus comprises an advancing device and is supported on the internal walls of the pipe by means of bearings, wheels, or equivalent means. According to this document, a cutting tool cuts the projections as it is spinning.

Document U.S. Pat. No. 4,822,221A reveals a unit for removal of welding barbs in a pipe. The unit comprises an actuator motor and a gearbox mounted in a housing. A cutting tool removes the barbs as the tool rotates.

Document U.S. Pat. No. 4,682,921A describes an apparatus to remove burrs from pipes, comprising a pair of wheels spaced apart and lined up with a cutting tool. A propelling wheel is pivotally mounted on the side of the body of the apparatus, opposite to the cutting tool to push it against the surface to be cut.

As can be seen, the documents in the state of the art listed show several types of apparatuses to remove burrs and projections from the interior of pipes. It is also seen that all of them describe propulsion and movement systems inside the pipes, which are comprised of motors and transmission systems.

However, none of the documents found mention an apparatus that comprises a cutting tool positioned at the front of the device, which would make the process of removing burrs from welding processes much more efficient.

As will be better detailed below, the present invention seeks to resolve the problems in the state of the art described above in a practical and efficient manner.

SUMMARY OF THE INVENTION

The objective of the present invention is to provide a device to remove burrs in pipes, comprising a cutting tool positioned at the front of the device, in which the diameter of the tool is slightly smaller than the diameter of the pipe.

In order to attain the objective described above, the present invention provides a device to remove internal blockage materials from a fluid-conveying line, which comprises a cutting tool that is activated by a rotary actuator, in which: the cutting tool is positioned at the front of the device; and the diameter of the cutting tool is smaller than the internal diameter of the fluid-conveying line.

BRIEF DESCRIPTION OF THE FIGURES

The detailed description presented below references the attached figures and their respective reference numbers.

FIG. 1 shows a device for removal of internal blockage materials from a fluid-conveying line, in accordance with an optional configuration of the present invention.

DETAILED DESCRIPTION OF THE INVENTION

First, it is noted that the following description will refer to the preferred embodiment of the invention. As will be obvious to any technician in the matter, however, the invention is not limited to that particular embodiment.

FIG. 1 shows a device for removal of internal blockage materials 10 from a fluid-conveying line 3, in accordance with an optional configuration of the present invention.

In the more general configuration of the invention, the device for removal of internal blockage materials 10 from a fluid-conveying line 3 comprises a cutting tool 9 activated by a rotary actuator 8, in which the cutting tool 9 is positioned at the front of the device, and the cutting tool 9 has a smaller diameter than the internal diameter of the fluid-conveying line 3. The diameter of the cutting tool is preferably slightly smaller than the internal diameter of the fluid-conveying line 3.

Therefore, as the cutting tool 9 is positioned at the front of the removal device, the process of removing internal blockage materials 10 from the fluid-conveying line 3 is much more efficient and is done as the tool advances inside the fluid-conveying line 3.

As already described in this document, the internal blockage material 10 in the conveyance line 3 may be burrs from pipe-welding processes.

Optionally, in order to enable the device of the present invention to be centered, it may have a protective coating 2 that partially wraps the device. Note that in order for the device now being described to operate more efficiently, it is important that the cutting tool 9 be kept outside the protective coating 2. Therefore, the cutting tool 9 may come very close to the internal wall of the fluid-conveying line 3, cleaning the internal wall better.

In addition, the device may comprise a shaft 5 adapted to transfer the rotating force between the rotary actuator 8 and the cutting tool 9, in which the shaft 5 may be supported by brackets 4 inside the protective coating 2.

In this configuration, as the protective coating 2 centers the device inside the line 3, the cutting tool 9 is also centered, further optimizing the process and allowing removal of burrs 10 in a position that is very close to the internal wall of the fluid-conveying line 3.

With the objective of facilitating movement of the assembly inside the pipe, the protective coating 2 may have casters 6 on its external wall. Thus, when the removal device is placed inside a fluid-conveying line 3, the casters minimize the interference from friction, facilitating its movement.

Optionally, the removal device may comprise a longitudinal force operating system 1 adapted to exert longitudinal force on the cutting tool 9. Thus, the longitudinal force operating system 1 may press the cutting tool 9 against the burrs 10, resulting in more efficient operation of the tool.

When this configuration is used, the longitudinal force operating system 1 may be connected internally to the protective coating 2, therefore when this exerts longitudinal force against the cutting tool 9, the longitudinal force operating system 1 does not move in the opposite direction, ensuring that the only movement of the cutting tool 9 is in the direction of the burr 10.

In the configuration described in the above paragraphs, one may wish for the protective coating 2 to be prevented from moving inside the fluid-conveying line 3. Thus, by locking the protective coating 2, the longitudinal force exerted on the cutting tool 9 becomes more efficient.

For this, the invention also provides that, optionally, the removal device will contain external retractable fastening clips 7, adapted to be affixed to the internal wall of the fluid-conveying line 3. Therefore, when the device is positioned close to the point of use, the fastening clips 7 are activated, causing the removal device to lock. At this moment, the other elements may be activated, as described above.

From what has been described up to this point, the device for removing internal blockage materials 10 from a fluid-conveying line 3, extracts the internal material 10 that originates from manufacture, construction, maintenance, and operation of the transport lines 3, by applying force derived from rotating movements and advance of the cutting tool 9 in parallel to the transport line 3 against the internal blockage material 10.

The cutting tool 9 may be advanced by the longitudinal force operating system 1, operating in synchrony with the rotary actuator 8, which may be controlled by a command and response feedback system (not shown). Thus, the command system may alter both the rotating speed and the advance of the cutting tool 9 depending on the information received.

In addition, the rotary actuator 8 transfers the rotation forces through the shaft 5 that is supported by brackets 4 to the cutting tool 9. The body of the cutting tool 9 may be rigid, with or without retractable cutting inserts.

Therefore, the longitudinal force operating system 1 and the rotary actuator 8 support the rotation and advance of the cutting tool on the internal blockage material 10. The longitudinal force operating system 1 may also be connected to the rotary actuator 8, connected to the shaft 5 and support brackets 4, and they may be housed inside the protective coating 2, which comprises a coating for physical and chemical protection, with a diameter that is smaller than that of the fluid-conveying line 3, where it is moved by the system of casters 6.

The process for extracting the internal blockage material 10 is, therefore, done by applying forces of reaction against the wall of the pipe 3 with the expansion of the fastening clips 7.

At the end of the process for extracting the internal blockage material 10, the fastening clips 7 are withdrawn, enabling the system for extracting internal blockage material from fluid-conveying lines to be moved by means of the system of casters 6, which may comprise a controlled power supply to move the removal device now being described.

Therefore, the present invention provides a device for removing internal blockage materials 10 from a fluid-conveying line 3, which extracts internal material 10 arising from manufacture, construction, maintenance, and operation of the conveyance lines 3, in an extremely simple and efficient manner, and in a way that is completely new in relation to what is known in the state of the art.

Once again, it is noted that countless variations to the scope of protection of this application are allowed. Thus, the fact that the present invention is not limited to the particular configurations/embodiments described above is highlighted.

The invention claimed is:

1. A device for removal of internal blockage materials from a fluid-conveying line, the device comprising:
   a cutting tool activated by a rotary actuators;
   a protective coating partially wrapping the device; and
   a shaft to transfer a rotation force between the rotary actuator and the cutting tool,
   wherein the cutting tool is positioned at the front of the device and the diameter of the cutting tool is smaller than the internal diameter of the fluid-conveying line,
   wherein the front of the device is on the side of the device advancing into the fluid conveying line,
   wherein the cutting tool is held outside the protective coating, and
   wherein the shaft is supported by brackets inside the protective coating.

2. The device of claim 1,
   wherein the protective coating includes casters on an external wall of the protective coating, and wherein the casters comprise a controlled power supply to move the device.

3. The device of claim 2, further comprising:
a longitudinal force operating system adapted to exert longitudinal force on the cutting tool,
wherein the longitudinal force operating system is attached internally to the protective coating.

4. The removal device of claim 2, wherein the protective coating includes external retractable fastening clips configured to be attached to the internal wall of the fluid-conveying line.

5. The device of claim 1, further comprising:
a longitudinal force operating system to exert longitudinal force on the cutting tool,
wherein the longitudinal force operating system is attached internally to the protective coating.

6. The device of claim 5, wherein the protective coating includes external retractable fastening clips configured to be attached to the internal wall of the fluid-conveying line.

7. The device of claim 1, wherein the protective coating includes external retractable fastening clips configured to be attached to an internal wall of the fluid-conveying line.

8. The device of claimer 1,
wherein the protective coating includes casters on an external wall of the protective coating, and
wherein the casters comprise a controlled power supply to move the device.

9. The device of claimer 1, further comprising:
a longitudinal force operating system adapted to exert longitudinal force on the cutting tool,
wherein the longitudinal force operating system is attached internally to the protective coating.

10. The device of claimer 1, wherein the protective coating includes external retractable fastening clips configured to be attached to the internal wall of the fluid-conveying line.

* * * * *